(12) United States Patent
Luo

(10) Patent No.: US 12,479,963 B2
(45) Date of Patent: Nov. 25, 2025

(54) PREPARATION METHOD AND APPLICATION OF POROUS HYDROGEL ADSORBENT BASED ON RADIX ASTRAGALI RESIDUE

(71) Applicant: SHANGHAI JIAO TONG UNIVERSITY, Shanghai (CN)

(72) Inventor: Jinming Luo, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 915 days.

(21) Appl. No.: 17/569,221

(22) Filed: Jan. 5, 2022

(65) Prior Publication Data

US 2022/0267538 A1 Aug. 25, 2022

(30) Foreign Application Priority Data

Feb. 24, 2021 (CN) .......................... 202110207736.6

(51) Int. Cl.
*C08J 3/075* (2006.01)
*B01J 20/28* (2006.01)
*B01J 20/30* (2006.01)

(52) U.S. Cl.
CPC ......... *C08J 3/075* (2013.01); *B01J 20/28047* (2013.01); *B01J 20/3071* (2013.01); *B01J 20/3085* (2013.01); *B01J 2220/445* (2013.01); *B01J 2220/4812* (2013.01); *C08J 2301/02* (2013.01); *C08J 2333/02* (2013.01); *C08J 2333/26* (2013.01)

(58) Field of Classification Search
CPC ....................................................... C08J 3/075
See application file for complete search history.

(56) References Cited

U.S. PATENT DOCUMENTS

| | | | | | |
|---|---|---|---|---|---|
| 3,619,349 | A | * | 11/1971 | Liebergott | D21C 9/123 162/76 |
| 3,890,225 | A | * | 6/1975 | Kajiyama | C04B 7/00 210/688 |
| 3,931,002 | A | * | 1/1976 | Ottenheym | B01J 20/24 210/688 |
| 2021/0062419 | A1 | * | 3/2021 | Tian | D21C 9/1005 |

OTHER PUBLICATIONS

CN 106390956 original (Year: 2017).*
CN106390956 translation (Year: 2017).*
CN 110270317 original (Year: 2019).*
CN110270317 translation (Year: 2019).*
CN101735395 original (Year: 2010).*
CN101735395 translation (Year: 2010).*
Guo et al, Int. J.Mol.Sci 2019, 20, 1463 (Year: 2019).*
CN106496642 original (Year: 2017).*
CN106496642 translation (Year: 2017).*
CN106223089 translation (Year: 2016).*
CN106223089 original (Year: 2016).*
CN106223095 original (Year: 2016).*
CN106223095 translation (Year: 2016).*

* cited by examiner

*Primary Examiner* — Irina Krylova

(57) ABSTRACT

The present disclosure provides a preparation method of a porous hydrogel adsorbent based on *Radix astragali* residues, including the following steps: subjecting residues of Chinese herbal medicine *Radix astragali* as a precursor to bleaching with $NaClO_2$, alkaline washing with KOH, and high power ultrasonic treatment, thereby obtaining a precursor solution of uniformly dispersed cellulose nanofibers (CNFs); adding the precursor solution of CNFs to a mixed solution of N,N'-methylene bisacrylamide (MBA), acrylic acid (AA) and ammonium persulfate (APS), shaking evenly, and initiating a polymerization reaction at a predetermined temperature to form a monolithic gel; and cleaning the monolithic gel, putting the cleaned monolithic gel into a dimethyl sulfoxide (DMSO) solution containing epichlorohydrin to allow reaction, and transferring the product of the reaction to an aqueous sodium hydroxide solution containing triethylene tetramine to allow reaction, thereby finally obtaining an amino-functionalized porous hydrogel adsorbent.

5 Claims, 5 Drawing Sheets

PREPARATION METHOD AND APPLICATION OF POROUS HYDROGEL ADSORBENT BASED ON RADIX ASTRAGALI RESIDUE

CROSS REFERENCE TO RELATED APPLICATION

This patent applications claims the benefit and priority of Chinese Patent Application No. 202110207736.6 filed Feb. 24, 2021, the disclosure of which is incorporated by reference herein in its entirety as part of the present application.

TECHNICAL FIELD

The present disclosure belongs to the technical field of heavy metal wastewater treatment and relates to a preparation method and application of a porous hydrogel adsorbent based on *Radix astragali* residues.

BACKGROUND ART

China has a wide variety of large-scale mineral resources, with 171 types of explored mineral resources and accounts for 12% of the world's total reserves. In addition, China is one of the largest producers and consumers of metals/metalloids in the world, such as antimony (Sb), iron (Fe), lead (Pb), manganese (Mn), tin (Sn), tungsten (W) and zinc (Zn). At present, some conventional physical and chemical treatment techniques are prone to resulting in a large amount of waste sediment, causing secondary pollution, promote the secondary diffusion to the environment, and cannot completely eliminate heavy metal pollution in water. Therefore, it is imperative to develop a green, facile, effective and economical treatment method.

As a simple, efficient and easy-to-operate water treatment technique, adsorption technique has been widely used in removal of heavy metals. The surface of adsorbents have abundant functional groups such as —OH, —$NH_2$ and —COOH, which provide abundant adsorption sites to effectively adsorb heavy metals on the surface of the adsorbents, thereby realizing the removal of heavy metals from water matrixes. At present, among the adsorbents that have been reported, nano-adsorbents exhibit excellent adsorption performance to heavy metals. However, nano-adsorbents have the disadvantages of low yield, difficult to separate, and high cost, which severely limit their application prospects in practical engineering. Carbon-based adsorbents such as activated carbon show weak adsorption capacity to heavy metals and cannot be effectively applied to the removal of heavy metals. Thus, it is imperative to find a technique that can simultaneously reutilize solid wastes and remove heavy metals from water.

As the major producer and user of traditional Chinese medicine in the world, China discharges up to 60-70 million tons of medicine residues every year, which is one of the largest categories of solid waste of traditional Chinese medicine enterprises. Chinese medicine residues have high water content and are extremely perishable. Traditional methods for treating Chinese medicine residues mainly include incineration, landfill, etc. There are few reports on recycling of Chinese medicine residues. In recent years, hydrogel adsorbents with excellent adsorption performance to heavy metals have been reported. These adsorbents are synthesized with jute, starch and humic acids as precursors by using a one-step alkaline dissolution method. This method provides an effective way for the disposal and resource utilization of traditional Chinese medicine residues, and the hydrogel adsorbents prepared can effectively solve the problem of heavy metal pollution in water. However, some insoluble Chinese medicine residue such as *Radix astragali* are difficult to obtain homogeneous cellulose precursor solution by one-step alkaline dissolution method. This seriously affects the subsequent cross-linking process and is not conducive to the establishment of a hydrogel system, so it is difficult to further synthesize the porous hydrogel adsorbent materials.

SUMMARY

In view of the shortcomings of the prior art, the present disclosure aims to provide a preparation method and application of a porous hydrogel adsorbent based on *Radix astragali* residues. As a result, the hydrogel adsorbents can be utilized to effectively remove heavy metals while the disposal and reuse of residues are also realized simultaneously. In addition, the prepared hydrogel adsorbent has low cost, excellent chemical stability and cycling performance. It is easy to separate without secondary pollution and has high adsorption performance for a variety of heavy metals in practical application. The novel hydrogel adsorbents based on Chinese medicine residues exhibit great application potential and prospect in waste water treatment.

In order to achieve the objective of the present disclosure, the following technical solutions are provided.

The present disclosure provides a preparation method of a porous hydrogel adsorbent based on *Radix astragali* residues, including the following steps:

subjecting residues of Chinese herbal medicine *Radix astragali* as a precursor to bleaching with $NaClO_2$, alkaline washing with KOH, and high power ultrasonic treatment, thereby obtaining a precursor solution of uniformly dispersed cellulose nanofibers (CNFs);

adding the precursor solution of CNFs to a mixed solution of N,N'-methylene bisacrylamide (MBA), acrylic acid (AA) and ammonium persulfate (APS), shaking evenly, and initiating a polymerization reaction at a predetermined temperature to form a monolithic gel;

cleaning the monolithic gel, putting the cleaned monolithic gel into a dimethyl sulfoxide (DMSO) solution containing epichlorohydrin to allow reaction, and transferring the product to an aqueous sodium hydroxide solution containing triethylene tetramine to allow reaction, finally obtaining an amino-functionalized porous hydrogel adsorbent.

Preferably, the preparation method of a porous hydrogel adsorbent based on *Radix astragali* residues includes the following steps:

(1) Preparation of the Precursor Solution of CNFs:

adding *Radix astragali* residue powder to a $NaClO_2$ solution, stirring at a predetermined temperature to remove lignin in the *Radix astragali* residues, removing supernatant after settling of particles, adding the treated *Radix astragali* residue particles to a strongly alkaline KOH solution, stirring at a set temperature to remove hemicellulose in the *Radix astragali* residues and obtain white *Radix astragali* residue cellulose pulp, washing the pulp to obtain neutral pulp, preparing a cellulose suspension, and subjecting the cellulose suspension to high power ultrasonic treatment to obtain the precursor solution of uniformly dispersed CNFs;

(2) Preparation of CNFs/Polyacrylic Acid (PAA) Hydrogel Adsorbent:
  adding the CNFs to the mixed solution of N,N'-methylene bisacrylamide, acrylic acid and ammonium persulfate, shaking evenly, and initiating a free radical polymerization reaction in a drying oven to obtain the CNFs/PAA hydrogel adsorbent; and
(3) Preparation of an $NH_2$-CNFs/PAA Hydrogel Adsorbent:
  cleaning the CNFs/PAA hydrogel to remove impurities, cutting the hydrogel into slices, putting the slices into the DMSO solution containing epichlorohydrin to allow reaction, and transferring the product of the reaction to the aqueous sodium hydroxide solution containing triethylene tetramine to allow reaction, thereby finally obtaining the porous hydrogel adsorbent $NH_2$-CNFs/PAA.

Preferably, step (1) includes the following specific steps: adding 5 g of the *Radix astragali* residue powder to 100 mL of the $NaClO_2$ solution at a mass concentration of 1-10 wt %, stirring in a water bath kettle at a temperature of 70° C. to 80° C. for 2 to 3 hours, taking out the mixture for standing for 1 to 10 minutes after the yellow powder turns white, directly removing the supernatant, adding 100 mL of 1-10 wt % aqueous KOH solution to the precipitate, stirring for 1 to 3 hours at an adjusted water bath temperature of 85° C. to 95° C. to obtain a white suspension, transferring the white suspension to a Buchner funnel for filtration, washing until the supernatant in the Buchner funnel is neutral, transferring the filter cake to 100 mL of deionized water and shaking evenly, and performing ultrasonic treatment on the neutral white suspension using an ultrasonic cell disruptor with ultrasonic power of 1200 W*90% for 0.5 to 2 hours, thereby obtaining a thick precursor solution of uniformly dispersed CNFs.

Further, the precursor solution of CNFs has a mass concentration of 0.5-10 wt %, further preferably 5 wt %.

Preferably, step (2) includes the following specific steps: weighing and putting 20 mg of MBA powder into a centrifuge tube, adding 600 µL of AA monomer to the centrifuge tube to dissolve the MBA which is used as a crosslinking agent, followed by sequentially adding 3 mL of the solution of CNFs and 5 mg of APS powder to the centrifuge tube, mixing evenly by shaking, placing the centrifuge tube in the drying oven at a temperature of 50° C. to 70° C. to allow reaction for 2 to 6 hours, thereby obtaining a columnar CNFs/PAA hydrogel adsorbent material.

Preferably, step (3) includes the following specific steps: washing the CNFs/PAA gel with deionized water to remove unreacted reagents on the surface thereof, followed by cutting the gel into slices, adding 0.6 mL of CNFs/PAA to 2 mL of the DMSO solution containing 0.1 g of NaOH and 0.15 mL of epichlorohydrin to allow reaction at a temperature of 50° C. to 70° C. for 0.5 to 2 hours, and adding the product of the reaction to 2 mL of the aqueous sodium hydroxide solution containing 0.2 mL of triethylene tetramine to allow reaction at a temperature of 50° C. to 70° C. for 1 to 4 hours, thereby obtaining the amino-functionalized porous hydrogel adsorbent $NH_2$-CNFs/PAA.

Further, the sodium hydroxide solution containing triethylene tetramine has a mass concentration of 2-20%, further preferably 7-16%.

The present disclosure further provides a porous hydrogel adsorbent prepared by using the method described above. The porous hydrogel includes the following components: 2-8% by mass of CNFs, 10-20% by mass of PAA, 1-3 mol % of MBA relative to AA, and 0.1-0.5 mol % of APS relative to AA.

The present disclosure further provides application of the porous hydrogel adsorbent in removal of heavy metals from wastewater.

The preparation method of the present disclosure is based on a combination of bleaching with $NaClO_2$, alkaline washing with KOH and high power ultrasonic treatment. This method can effectively solve the problem of difficult dissolution of *Radix astragali* residues and obtain a stable and uniform nanofiber precursor solution, thereby allowing for further synthetization of the desired gel adsorbent. In the present disclosure, a dual-network hydrogel adsorbent is subjected to functional modification with amino groups at different alkali concentrations, and it is found that the alkali concentration can directly affect the amino group loading and the mechanical properties of the modified material, thus further affecting the adsorption performance of the material.

The inventors have discovered through their research that the hydrogel adsorbent of the present disclosure exhibits excellent adsorption performance to a variety of heavy metals such as Pb, Cd, and Cu and that the prepared gel adsorbent has excellent mechanical strength and thus can be stably present in water and easy to separate. High water content (about 70%) greatly improves the mass transfer and diffusion efficiency of heavy metals on the surface and in the pores of the adsorbent. The surface of the adsorbent is decorated with a large amount of amino groups, which is conducive to the chelation of the material with heavy metal ions, thereby improving the adsorption performance of the material.

The technical solutions of the present disclosure have the following characteristics:

The adsorbent of the present disclosure can effectively remove heavy metals from water within 10 minutes. When the initial concentration of Pb (II) is 10 mg/L, the removal rate can be up to 100%. After repeated use, the adsorbent can still maintain excellent adsorption performance after being washed with an acid at a low concentration (e.g., 0.1 mmol/L). The present disclosure can synthesize a value-added hydrogel adsorbent product with high removal capacity to heavy metals while effectively recycling Chinese medicine residues.

For the insoluble *Radix astragali* residues, the present disclosure realizes sufficient dissolution of the residue powder through a combination of bleaching with $NaClO_2$, alkaline washing with KOH and high power ultrasonic treatment, which assures the preparation of a homogeneous dual-network hydrogel adsorbent with excellent performance. As a result, the precursor solution of CNFs required by the dual network structure can be obtained. Moreover, the solution can be uniform and stable without aggregation, creating a condition for the synthesis of the dual-network gel adsorbent. It is found that the main components in the *Radix astragali* residue powder are similar to those of wood powder, mainly including cellulose, which are coated with lignin, hemicellulose, etc. The base materials such as hemicellulose and lignin in the raw materials should be removed to obtain relatively pure cellulose with fully exposed functional groups. Based on the strong oxidizing property of $NaClO_2$, the insoluble cellulose raw material is soaked in the $NaClO_2$ solution and stirred without using a bleaching activator (acetic acid). After the treatment with $NaClO_2$, lignin is effectively removed from the *Radix astragali* residue powder, and the structure of cellulose chain is intact. The treated *Radix astragali* residue powder gradually fades in color while the bleaching solution gradually turns light yellow, which visually indicates the effective removal of the lignin. Subsequently, the pretreated *Radix astragali* residue powder is subjected to alkaline washing with the KOH solution so that the hemicellulose and residual lignin can be further effectively removed, thereby obtaining the white cellulose pulp. Cellulose is a macromolecular polysaccharide composed of glucoses with rich —OH groups on the surface and is prone to aggregation in an aqueous solution. The specific manifestation is that the white cellulose pulp settles immediately after standing for about 5 minutes. This is also the main reason why the cellulose macromolecules cannot be effectively dissolved by using the existing technology. In view of the technical difficulty, the present disclosure introduces the high power ultrasonic technology for the first time. Through high power ultrasonic disruption, the interfacial energy of the cellulose molecules can be reduced, and the hydrogen-bond interaction in the cellulose molecules can be destroyed, so that the cellulose can be uniformly and stably dispersed in an aqueous solution.

The porous hydrogel adsorbent prepared in the present disclosure can effectively achieve recycling of Chinese medicine residues, and the synthesized hydrogel adsorbent can be further used in adsorption removal of heavy metals and has the advantages of excellent adsorption performance, low cost, high stability, high anti-ion interference capability, and good reusability.

According to the present disclosure, different alkali concentrations are used to modify the CNFs/PAA gel for the first time. In the process of amino group loading, the concentration of the sodium hydroxide solution containing triethylene tetramine is 2%, 7%, 12%, 16%, 20%. The adsorption capacity of the modified material $NH_2$-CNFs/PAA to Pb (II) gradually increases from 525 mg/g to about 900 mg/g and then tends to be stable, while the mechanical properties show a slow decline, indicating that different alkali concentrations affect the loading of amino groups in the process of material modification. With increasing alkali concentration, the loading of amino groups is gradually increased and then reached saturation, which will sacrifice the stability of the material while improving the adsorption capacity.

DETAILED DESCRIPTION OF THE EMBODIMENTS

Figure 1:
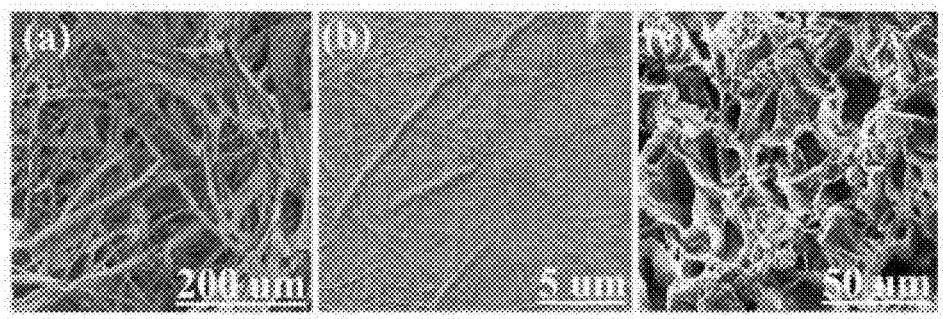
FIG. 1 shows scanning electron microscope (SEM) images of CNFs before and after ultrasonic treatment and of CNFs/PAA gel material after freeze-drying.

The technical solutions in embodiments of the present disclosure will be clearly and completely described below. Apparently, the described embodiments are merely some rather than all of the embodiments of the present disclosure. All other embodiments derived from the embodiments of the present disclosure by a person of ordinary skill in the art without creative efforts should fall within the protection scope of the present disclosure.

The present disclosure will be further described below in combination with specific examples and the drawings.

Example 1: Preparation of Precursor Solutions of CNFs (1) Bleaching with $NaClO_2$: to dissolve different quantities of poorly soluble *Radix astragali* residue powders by mass, firstly, $NaClO_2$ solutions at different mass concentrations 1 wt %, 5 wt %, 8 wt %, and 10 wt %, each 100 mL, were put into four 250 mL beakers, denoted as I, II, III, and IV. The four beakers were placed in four water bath kettles. The temperature of all the water bath kettles was adjusted to 75° C., and then 0.5 g, 5 g, 8 g, 10 g of *Radix astragali* residue powders corresponding to the mass concentrations of the $NaClO_2$ solutions were added to the four beakers, and stirred fully for 3 to 4 hours.

(2) Alkaline washing with KOH: the beakers were taken out after the yellow powder turned white gradually and allowed to stand for 5 minutes. After the supernatant was removed, KOH solutions at different mass concentrations 1 wt %, 5 wt %, 8 wt %, and 10 wt %, each 100 mL, were added to the four beakers. The temperature of all the water bath kettles was adjusted to 90° C., and stirring was continued for 2 hours until the white particles were gradually transformed into white floccule to obtain white cellulose pulp. Experiments demonstrated that the *Radix astragali* powder that had not been treated with bleaching agent $NaClO_2$ could not be dissolved after being directly added to the strong alkali KOH and continuously stirred at 90° C. for several hours. The white cellulose pulps of four different concentrations were taken out of the water bath kettles, and after cooling to room temperature, transferred to four suction filters to remove excess KOH by suction filtration. During the process, the cellulose floccule was always maintained in a water swelling state (to prevent the formation of strong hydrogen-bond interaction (which would affect the subsequent dissolution of the cellulose) between the cellulose molecules due to too dry cellulose floccule after the suction filtration). The suction filtration was stopped after the pH of the supernatant in a Buchner funnel became neutral, and white cellulose filter cake was obtained.

(3) Ultrasonic treatment: four filter cakes different in mass (from 0.5 g, 5 g, 8 g, and 10 g of *Radix astragali* residue powders) were transferred to four 250 mL tall beakers, also denoted as I, II, III, and IV. Each of the four tall beakers was added with 100 mL of deionized water and shaken to make the cellulose cake evenly dispersed. After standing for about 5 minutes, aggregation of the cellulose molecules occurred. The tall beakers were shaken again to make the cellulose molecules dispersed for a short time before the ultrasonic treatment. The tall beakers I, II, III, and IV were sequentially placed in a 1000 mL large beaker, and an appropriate amount of ice-water mixture was added to the large beaker to provide an ice bath environment. The tall beakers were fixed by using foam molds, and then the 1000 mL large beaker was transferred to a soundproof box of an ultrasonic cell disruptor and adjusted in height. Subsequently, high power ultrasonic treatment was started with the power of 1200 W*90% and lasted for 1 hour. During the ultrasonic treatment, the ice-water mixture in the large beaker was replaced timely to control the temperature within the normal working temperature range of the ultrasonic cell disruptor. After the ultrasonic treatment was completed, CNFs solutions at the mass concentrations of 0.5 wt %, 5 wt %, 8 wt %, and 10 wt % (measured based on the amount of the used raw material) were obtained in the tall beakers I, II, III, and IV, and all could be stable against aggregation for a long time.

Experiments demonstrated that when the tall beakers I, II, III, and IV were placed in an ordinary ultrasonic apparatus (maximum power 600 W) for ultrasonic treatment under the maximum ultrasonic power, the cellulose molecules could not be effectively dissolved in deionized water after ultrasonic treatment for a long time (>72 hours), indicating that the cell disruptor played a decisive role in the process of dissolving the cellulose molecules.

Example 2: Preparation of CNFs/PAA Hydrogel Adsorbent Materials

To each of four 5 mL centrifuge tubes, 20 mg of MBA powder was weighed and added, and 600 μL of acrylic acid monomer was added to each of the four centrifuge tubes by using a pipette to dissolve the crosslinking agent MBA. Then, 3 mL of CNFs solution was transferred from each of the tall beakers I, II, III, and IV to the corresponding centrifuge tube. Finally, 5 mg of APS powder was added to each of the four centrifuge tubes. The centrifuge tubes were shaken fully to make the mixtures therein mixed evenly. The four centrifuge tubes were placed in a drying oven at 60° C. for reaction for 4 hours, thereby obtaining four columnar CNFs/PAA dual-network hydrogel adsorbent materials, denoted as CNFs/PAA-1, CNFs/PAA-2, CNFs/PAA-3, and CNFs/PAA-4.

Preparation of $H_2O$/PAA hydrogel material: to a 5 mL centrifuge tube, 20 mg of MBA powder, 3 mL of $H_2O$, 600 μL of AA monomer, and 5 mg of APS powder were added, shaken evenly, and placed in the drying oven at 60° C. to allow reaction for 4 hours, thereby obtaining a columnar transparent $H_2O$/PAA gel.

The four CNFs/PAA gels in Example 2 were compared with the $H_2O$/PAA gel by using a universal tester, and the results showed that the mechanical properties of these gels were ranked as follows: $H_2O$/PAA<CNFs/PAA-1<CNFs/PAA-2≈CNFs/PAA-3≈CNFs/PAA-4, indicating that with the introduction of CNFs, the mechanical properties of the gels were enhanced, and with increasing concentration of the CNFs solutions, the mechanical properties would gradually increase first and then become stable.

Example 3: Preparation of $NH_2$-CNFs/PAAs

CNFs/PAA having a cellulose content of 5 wt % was selected as the material to be modified, cut into slices, and added to 2 mL of DMSO solution containing 0.1 g of NaOH and 0.15 mL of epichlorohydrin in a ratio of 2 mL DMSO per 0.6 mL to allow reaction at 60° C. for 1 hour. After the reaction was completed, the product of the reaction was to NaOH aqueous solutions containing 0.2 mL of triethylene tetramine at concentrations of 2 wt %, 7 wt %, 12 wt %, 16 wt %, and 20 wt %, each for 2 mL, to allow reaction at 60° C. for 2 hours, obtaining $NH_2$-CNFs/PAA-1, $NH_2$-CNFs/PAA-2, $NH_2$-CNFs/PAA-3, $NH_2$-CNFs/PAA-4, and $NH_2$-CNFs/PAA-5, respectively. The resulting materials were ranked according to their mechanical properties in the following order: $NH_2$-CNFs/PAA-1>$NH_2$-CNFs/PAA-2≈$NH_2$-CNFs/PAA-3≈$NH_2$-CNFs/PAA-4>>$NH_2$-CNFs/PAA-5. The adsorption capacities of the resulting materials were 525 mg/g, 900 mg/g, 900 mg/g, 900 mg/g, and 950 mg/g.

To sum up, to prepare the precursor solution of CNFs at the best concentration and the dual-network gel structure with the best mechanical properties and the best adsorption effect, the following three points need to be paid attention to: 1) the use of the bleaching agent before the alkaline washing; 2) the high power ultrasonic treatment of the cellulose pulp pretreated by bleaching and alkaline washing; and 3) the selection of the optimal concentration of the solution of CNFs and the optimal alkali concentration required for modification.

First, the key point 1, namely the use of the bleaching agent, is explained as follows: a large number of experiments have proved that the *Radix astragali* residue powder cannot be effectively dissolved by using the direct one-step alkaline dissolution method. Therefore, to effectively dissolve it, this study uses bleaching-alkaline washing for the first time to pretreat the *Radix astragali* residue powder. The *Radix astragali* residue powder treated by bleaching (i.e., with $NaClO_2$) can be initially dissolved in an alkaline solution (i.e., KOH). In the above experiment, the $NaClO_2$ solutions at the concentrations of 1 wt %, 5 wt %, 8 wt %, and 10 wt % were used to bleach 0.5 g, 5 g, 8 g, and 10 g of *Radix astragali* powders, respectively. After bleaching, the bleaching solutions were removed, and KOH solutions at the mass concentrations of 1 wt %, 5 wt %, 8 wt %, and 10 wt % were added. The bleaching effect can be achieved by correspondingly increasing the concentrations of the bleaching agent and the alkaline solution with increasing amount of the *Radix astragali* powder. The cellulose obtained after bleaching and alkaline washing was prone to aggregation. The specific manifestation was that the above-mentioned cellulose pulps settled within 5 minutes regardless of the initial concentration. To resolve the technical difficulty of easy settlement of the cellulose pulp, this study introduced the high power ultrasound technology for the first time to perform cell disruption on the solutions of CNFs at different concentrations of 0.5 wt %, 5 wt %, 8 wt %, and 10 wt %, thereby obtaining stable solutions of uniformly dispersed CNFs. It was observed through experiments that the CNFs that had been subjected to bleaching, alkaline washing and high power ultrasonic treatment did not settle after a week or even a month. For the selection of the optimal cellulose solution concentration, by comparing the mechanical properties of the dual-network hydrogels synthesized with CNFs at different initial concentrations, it could be concluded that when the concentration of the solution of CNFs was greater than or equal to 5 wt %, the mechanical properties of the gel basically were longer improved with the increase of the concentration. When the concentration of the solution of CNFs was less than or equal to 5 wt %, the mechanical properties of the gel were improved significantly with the increase of the cellulose concentration. When the 5 wt % solution of CNFs was used, the raw material could be saved and the required strength and effect of the material could be achieved. Therefore, it was concluded that 5 wt % was the optimal concentration of the solution of CNFs for preparing the dual-network hydrogel adsorbent material. By comparing the properties of the dual-network hydrogels obtained by modifying the CNFs/PAA with different alkali concentrations, it could be concluded that with the increase of the alkali concentration, the adsorption performance of the gel was significantly improved, and the mechanical properties were slightly reduced. When the alkali concentration was greater than or equal to 7 wt %, the adsorption capacity gradually tended to be saturated. When the alkali concentration was greater than or equal to 16 wt %, the mechanical properties were significantly reduced, and the adsorption performance was not significantly improved. Therefore, it could be concluded that the $NH_2$-CNFs/PAA obtained through modification with the alkali concentration of 7 wt %-16 wt % had the best overall performance.

FIG. 1 shows the SEM images of CNFs before and after ultrasonic treatment and of CNFs/PAA gel material after freeze-drying. From FIG. 1a (before ultrasonic treatment) and FIG. 1b (after ultrasonic treatment), it can be seen that the CNFs after the ultrasonic treatment were successfully dispersed from the original aggregation state. From FIG. 1c, it can be seen that the CNFs/PAA gel had a three-dimensional porous network structure, which was beneficial to the diffusion process of heavy metal ions in the solution in the gel system. Meanwhile, the adsorption sites on the polymer chains could be effectively exposed, allowing heavy metal ions to form a coordination structure with the gel and be adsorbed on the gel more easily.

Figure 2:
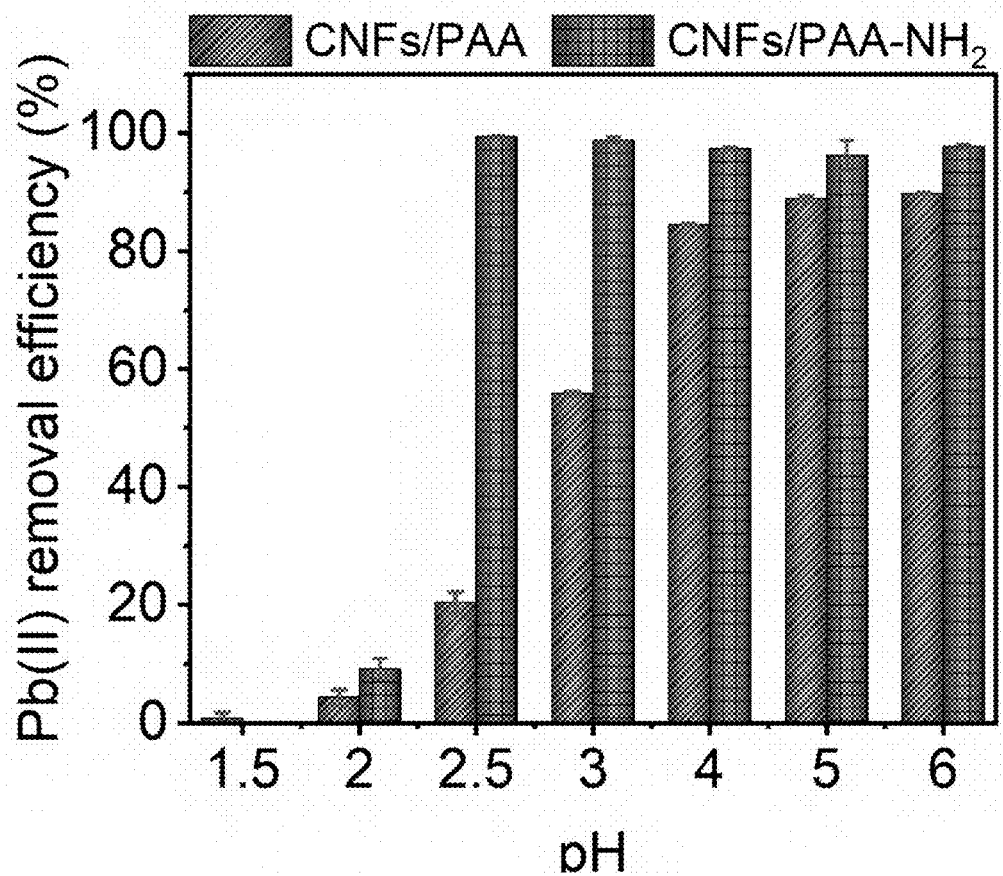
FIG. 2 is a graph showing the adsorption effects of CNFs/PAA gel affected by pH before and after modification (experimental conditions: $C_0$=50 mg/L, t=10 h, T=298 K, m/V=1 g/L).

FIG. 2 is a graph showing the adsorption effects of CNFs/PAA gel affected by pH before and after modification. It can be seen from FIG. 2 that for CNFs/PAA gel, when the pH value was less than or equal to 2, the CNFs/PAA gel had almost no effect on Pb (II). With the increase of pH, the adsorption of Pb (II) by the CNFs/PAA gel increased rapidly, and the adsorption rate of Pb (II) with $C_0$ of 50 mg/L could be about 83%. For $NH_2$-CNFs/PAA, when the pH was greater than 2, 100% adsorption could be achieved, indicating that the introduction of amino groups significantly improved the adsorption performance of the material.

Figure 3:
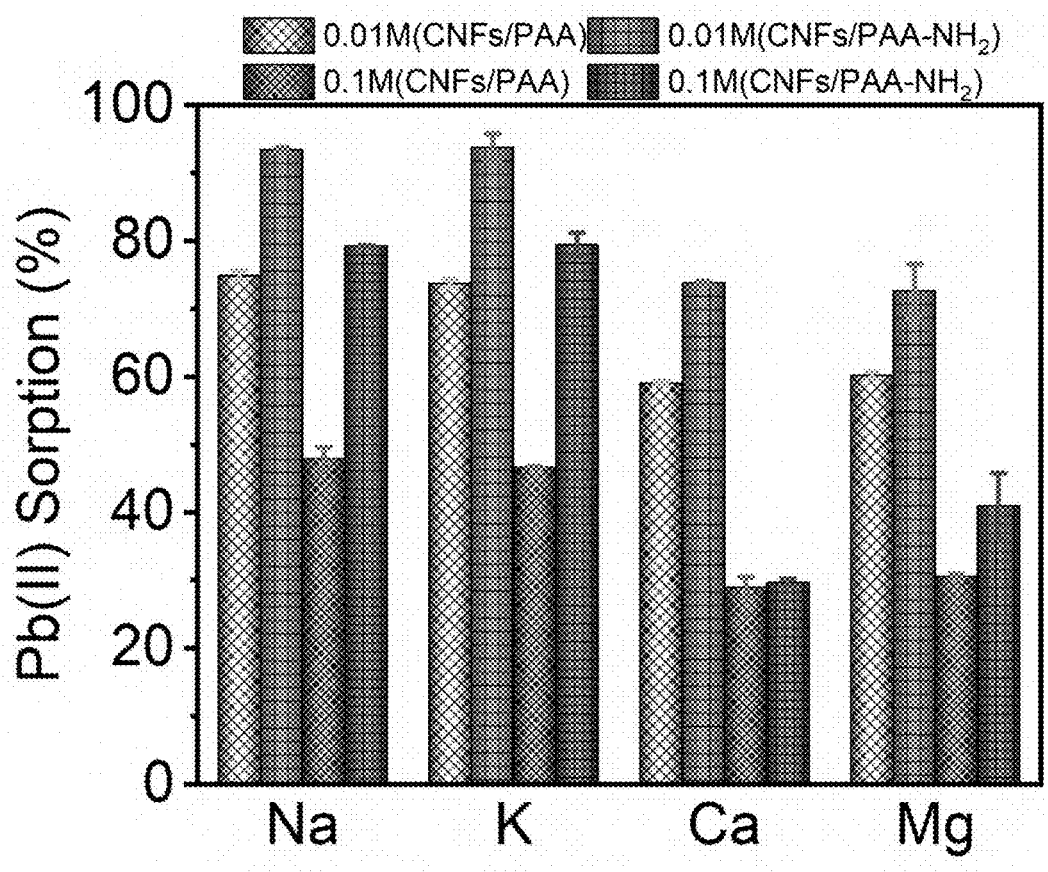
FIG. 3 is a graph showing the adsorption effects of CNFs/PAA gel affected by ionic strength before and after modification (experimental conditions: $C_0$=50 mg/L, t=10 h, T=298 K, m/V=1 g/L).

FIG. 3 is a graph showing the adsorption performance of CNFs/PAA gel under different ionic strength conditions before and after modification. It can be seen from the figure that when the ionic strength was increased to 0.1 mol/L, it had a greater impact on the adsorption performance of the CNFs/PAA gel to Pb (II) before and after the modification. Further, the ionic strength had higher impact on the CNFs/PAA gel after the modification than before the modification, indicating that the introduction of amino groups successfully reduced the influences of environmental factors on the material. Moreover, the influence of divalent cations (such as Ca (II), Mg (II)) on adsorption was more significant than that of monovalent cations (such as K(I), Na(I)). The four metal ions were ranked according to their influences on the adsorption process as follows: Mg (II)>Ca (II)>K (I)≈Na (I). This ranking was consistent with their electronegativity ranking (Mg=1.31, Ca=1.00, Na=0.93, K=0.82). The ion with higher electronegativity could compete with Pb (II) for adsorption and electrostatic repulsion, thus reducing its activity coefficient. As a result, the adsorption capability of the CNFs/PAA gel to Pb (II) was reduced.

Figure 4:
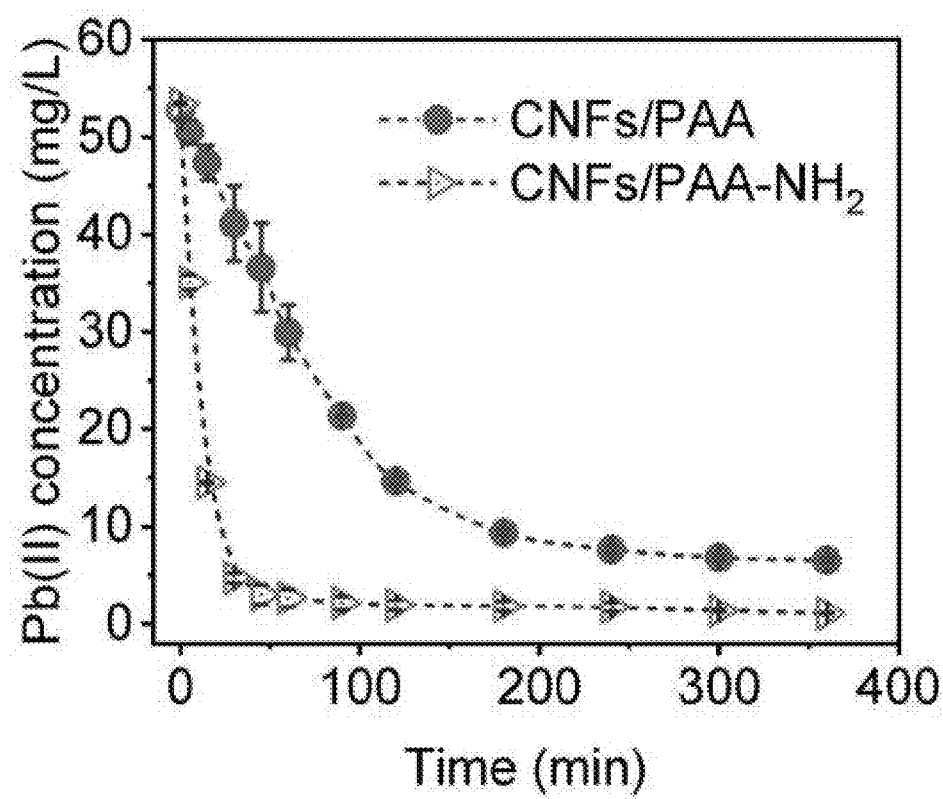
FIG. 4 is an adsorption kinetic curve of CNFs/PAA gel to Pb(II) before and after modification at room temperature (experimental conditions: $C_0$=50 mg/L, t=360 min, T=298 K, m/V=1 g/L).

FIG. 4 is an adsorption kinetic curve of CNFs/PAA gel to Pb (II) before and after modification at room temperature. It can be seen from the figure that before and after the modification, the CNFs/PAA gel took about 200 and 30 minutes to reach the adsorption equilibrium to Pb (II), and the adsorption rates were about 95% and 100%, respectively. This was mainly attributed to the three-dimensional porous network structure of the surface of the CNFs/PAA gel, which was conducive to the diffusion of metal ions inside the gel and avoided blocking of adsorption sites. It can be seen from the figure that the kinetic adsorption process of the CNFs/PAA gel to Pb (II) conformed to the pseudo-first-order kinetic fitting, indicating that the adsorption process of the CNFs/PAA gel was only related to the concentration of metal ions in the solution. Competitive adsorption among ions could be ignored.

Figure 5:
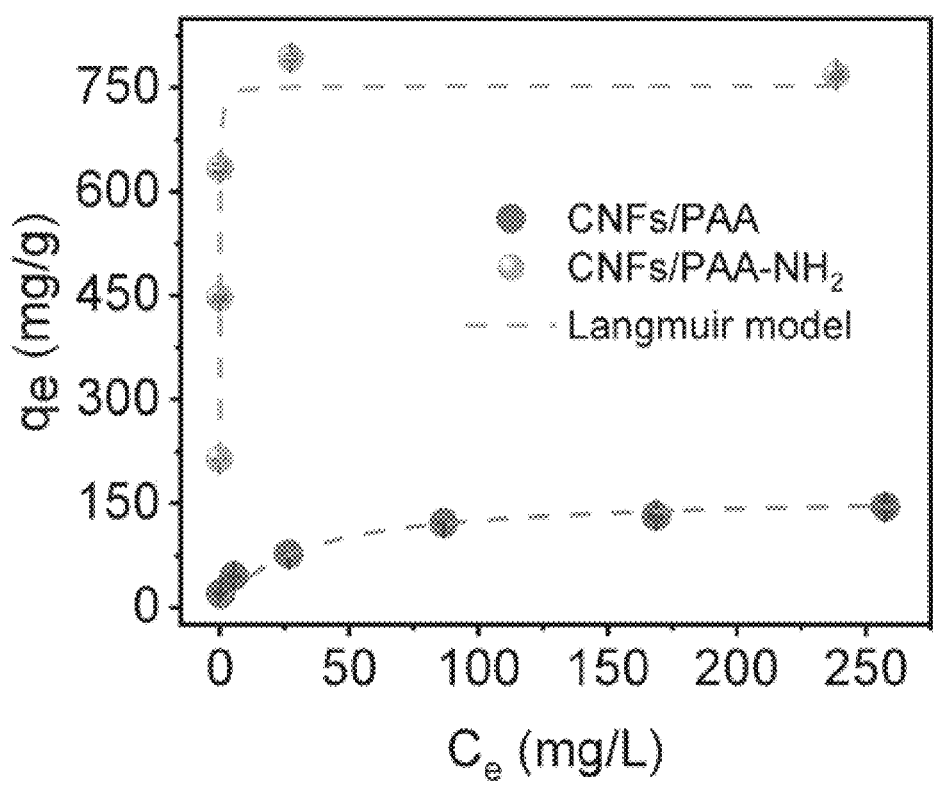
FIG. 5 is an adsorption isothermal curve of CNFs/PAA gel to Pb(II) before and after modification at room temperature (experimental conditions-before modification: $C_0$=20, 50, 100, 200, 300, 400 mg/L, t=24 h, T=298 K, m/V=1 g/L; experimental conditions-after modification: 100, 200, 300, 400, 600 mg/L, t=24 h, T=298 K, m/V=0.5 g/L).

FIG. 5 is an adsorption isothermal curve of CNFs/PAA gel to Pb (II) before and after modification at room temperature. It can be seen from the figure that the adsorption capacity was increased with the increase of the concentration of metal ions in the solution, and the adsorption equilibrium was achieved at a higher concentration. Further fitting analysis of the adsorption thermodynamic data showed that the adsorption process of the CNFs/PAA gel followed the classic Langmuir model, indicating that the adsorption of heavy metal ions onto the CNFs/PAA gel was a single-layer adsorption process and tended to be a chemical adsorption process involving electron transfer. The fitting results of the Langmuir model showed that the maximum theoretical adsorption capacity of the CNFs/PAA gel to Pb (II) was 160 and 900 mg/g (298 K) before and after modification, respectively.

Figure 6:
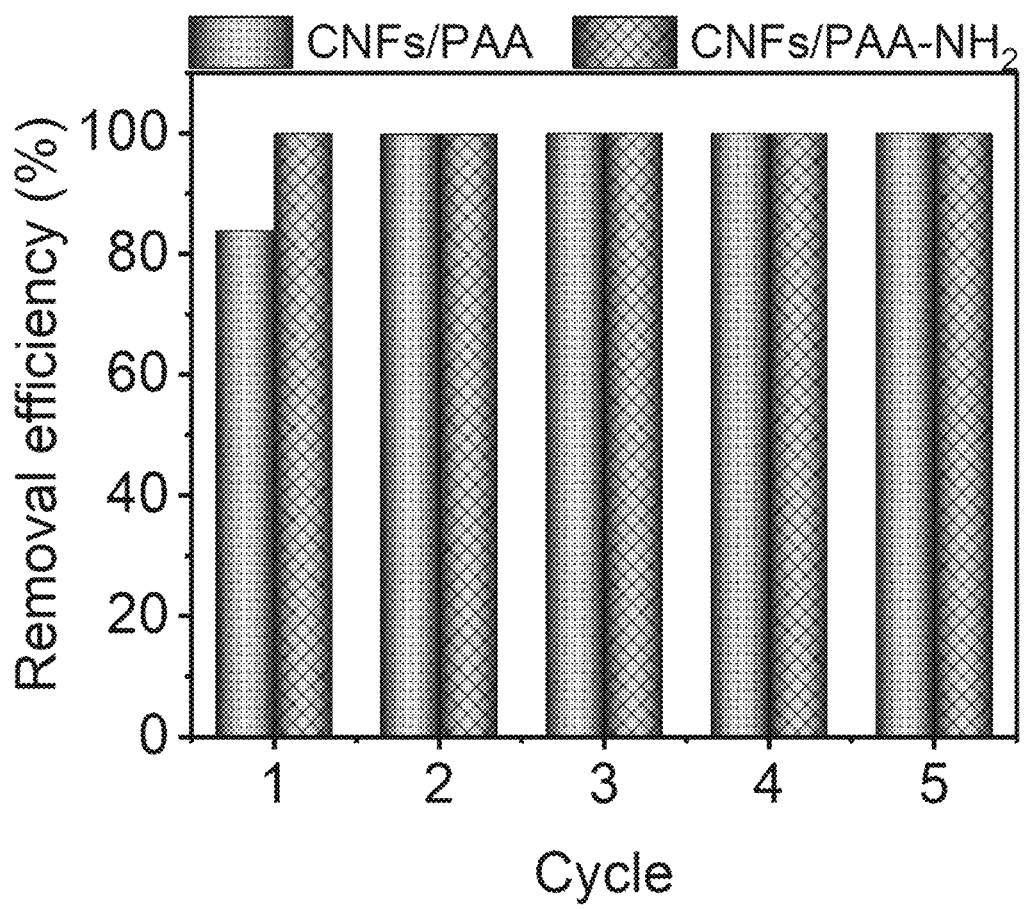
FIG. 6 is a test chart of CNFs/PAA gel stability before and after modification (experimental conditions: $C_0$=100 mg/L, t=10 h, T=298 K, m/V=1 g/L, 5 cycles).

FIG. 6 is a test chart of CNFs/PAA gel stability before and after modification (experimental conditions: $C_0$=100 mg/L, t=10 h, T=298 K, m/V=1 g/L, 5 cycles). It can be seen from the figure that the CNFs/PAA gel modified with amino groups had good reusability.

What is claimed is:

1. A preparation method of a porous hydrogel adsorbent based on *Radix astragali* residues, comprising the following steps:
    (1) preparation of a precursor solution of cellulose nanofibers (CNFs):
        adding the *Radix astragali* residue to a $NaClO_2$ solution having a mass concentration of 1-10 wt %, stirring in a water bath kettle at a temperature of 70° C. to 80° C. for 2 to 3 hours to remove lignin in the *Radix astragali* residues, removing a supernatant after settling of particles to obtain treated *Radix astragali* residue particles, adding an aqueous KOH solution having a concentration of 1-10 wt % to the treated *Radix astragali* residue particles, stirring at an adjusted water bath temperature of 85° C. to 95° C. to remove hemicellulose in the *Radix astragali* residues to obtain a white *Radix astragali* residue cellulose pulp, washing the white *Radix astragali* residue cellulose pulp to obtain a neutral cellulose suspension, and subjecting the neutral cellulose suspension to ultrasonic treatment with a ultrasonic power of 1200 W*90% for 0.5 to 2 hours to obtain the precursor solution of CNFs;
    (2) preparation of a CNFs/polyacrylic acid (PAA) hydrogel adsorbent:
        adding the precursor solution of CNFs to a mixed solution of N,N'-methylene bisacrylamide (MBA) and acrylic acid (AA), and then adding ammonium persulfate (APS) to a resulting mixture, shaking, and initiating a free radical polymerization reaction in a drying oven at a temperature of 50° C. to 70° C. to obtain a solid columnar CNFs/PAA hydrogel adsorbent; and
    (3) preparation of an $NH_2$—CNFs/PAA hydrogel adsorbent:
        cleaning the CNFs/PAA hydrogel adsorbent to remove impurities, cutting the CNFs/PAA hydrogel adsorbent into slices, putting the slices into a dimethyl sulfoxide (DMSO) solution containing epichlorohydrin, the DMSO solution containing 0.1 g of NaOH and 0.15 mL of epichlorohydrin to each 2 ml of DMSO, and conducting a first reaction, and transferring a resulting reaction product to an aqueous sodium hydroxide solution having a concentration of 7-16 wt % and containing triethylene tetramine, and conducting a second reaction, thereby finally obtaining the $NH_2$-CNFs/PAA hydrogel adsorbent having a porous structure, the $NH_2$—CNFs/PAA hydrogel adsorbent having adsorption capacities of between 525 mg/g and 950 mg/g.

2. The preparation method of the porous hydrogel adsorbent based on *Radix astragali* residues according to claim 1, wherein step (1) comprises the following specific steps: adding 5 g of the *Radix astragali* residue to 100 mL of the $NaClO_2$ solution at a having the mass concentration of 1-10 wt %, stirring in the water bath kettle at the temperature of 70° C. to 80° C. for 2 to 3 hours, taking out an obtained mixture for standing for 1 to 10 minutes after a yellow powder turns white, directly removing the supernatant to obtain the treated *Radix astragali* residue particles, adding 100 mL of the aqueous KOH solution having the concentration of 1-10 wt % to the treated *Radix astragali* residue particles, stirring for 1 to 3 hours at the adjusted water bath temperature of 85° C. to 95° C. to obtain the white *Radix astragali* residue cellulose pulp white suspension, transferring the white *Radix astragali* residue cellulose pulp to a Buchner funnel and conducting filtration, washing the white *Radix astragali* residue cellulose pulp in the Buchner funnel is neutral, transferring a resulting filter cake to 100 mL of deionized water and shaking to obtain the cellulose suspension, and subjecting the cellulose suspension to the ultrasonic treatment using an ultrasonic cell disruptor with the ultrasonic power of 1200 W*90% for 0.5 to 2 hours, thereby obtaining the precursor solution of CNFs.

3. The preparation method of the porous hydrogel adsorbent based on *Radix astragali* residues according to claim 2, wherein the precursor solution of CNFs has a mass concentration of 0.5-10 wt %.

4. The preparation method of the porous hydrogel adsorbent based on *Radix astragali* residues according to claim 3, wherein the precursor solution of CNFs has the mass concentration of 5 wt %.

5. The preparation method of the porous hydrogel adsorbent based on *Radix astragali* residues according to claim 1, wherein step (2) comprises the following specific steps: weighing and putting 20 mg of MBA powder into a centrifuge tube, adding 600 μL of AA monomer to the centrifuge tube to dissolve the MBA powder which is used as a crosslinking agent, and then adding 3 mL of the precursor solution of CNFs and 5 mg of APS powder in sequence to the centrifuge tube, mixing by shaking, placing the centrifuge tube in the drying oven at the temperature of 50° C. to 70° C. for 2 to 6 hours, thereby obtaining the CNFs/PAA hydrogel adsorbent.

* * * * *